United States Patent
Matsushima et al.

(10) Patent No.: US 9,659,420 B2
(45) Date of Patent: May 23, 2017

(54) SECURITY SYSTEM OF INFORMATION PROCESSING APPARATUS AND SECURITY CONTROL APPARATUS

(71) Applicant: STAR MICRONICS CO., LTD., Shizuoka-shi (JP)

(72) Inventors: Takaharu Matsushima, Shizuoka (JP); Hiromichi Takikita, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 52 days.

(21) Appl. No.: 14/567,951

(22) Filed: Dec. 11, 2014

(65) Prior Publication Data
US 2015/0187152 A1     Jul. 2, 2015

(30) Foreign Application Priority Data
Dec. 27, 2013   (JP) ................................. 2013-272901

(51) Int. Cl.
G07C 9/00       (2006.01)
G06F 21/35      (2013.01)
G06F 21/60      (2013.01)

(52) U.S. Cl.
CPC .......... G07C 9/00111 (2013.01); G06F 21/35 (2013.01); G06F 21/608 (2013.01)

(58) Field of Classification Search
CPC combination set(s) only.
See application file for complete search history.

(56) References Cited

U.S. PATENT DOCUMENTS

| | | | |
|---|---|---|---|
| 2002/0025804 A1 | 2/2002 | Hara | |
| 2005/0221798 A1* | 10/2005 | Sengupta | H04M 1/67 455/411 |
| 2008/0268906 A1 | 10/2008 | Ohmoto | |

(Continued)

FOREIGN PATENT DOCUMENTS

| | | |
|---|---|---|
| JP | 1983-192196 | 11/1983 |
| JP | 1988-141198 | 6/1988 |

(Continued)

OTHER PUBLICATIONS

The Extended European Search Report, May 28, 2015, European Patent Application No. 14198107.6.

(Continued)

*Primary Examiner* — Kabir A Timory
(74) *Attorney, Agent, or Firm* — Lex IP Meister, PLLC

(57) ABSTRACT

In a security system, a security control apparatus 300 includes an authentication processing unit 31 for perform an authentication on whether the mobile terminal is a permitted terminal, a distance determining unit 32 for determining whether the mobile terminal is located within a predetermined distance from a printer 100, and an unlocking unit 33 for transmitting an unlock instruction signal to the printer 100 when the authentication is successful and it is determined that the mobile terminal is located within the predetermined distance from the printer 100. Therefore, a locking mechanism of the printer 100 cannot be unlocked even if the authentication is successful, and the locking mechanism of the printer 100 can be unlocked when it is further determined the mobile terminal is located within the predetermined distance from the printer 100.

5 Claims, 17 Drawing Sheets

(56) References Cited

U.S. PATENT DOCUMENTS

| | | | |
|---|---|---|---|
| 2009/0284790 A1 | 11/2009 | Ohashi | |
| 2010/0201482 A1 | 8/2010 | Robertson | |
| 2013/0324081 A1 | 12/2013 | Gargi | |
| 2014/0364085 A1* | 12/2014 | Garcia | H04W 12/08 455/411 |

FOREIGN PATENT DOCUMENTS

| | | |
|---|---|---|
| JP | 1989-156055 | 10/1989 |
| JP | 2004-046425 | 2/2004 |
| JP | 2013-191209 | 9/2013 |
| WO | 2007/060888 | 5/2007 |

OTHER PUBLICATIONS

Notification of Reasons for Refusal, JPO, Application No. JP 2013-272901, Jan. 5, 2017.

* cited by examiner

SECURITY SYSTEM OF INFORMATION PROCESSING APPARATUS AND SECURITY CONTROL APPARATUS

CROSS-REFERENCE TO RELATED APPLICATION

The present application claims priority to and the benefit of Japanese Patent Application No. 2013-272901 filed on Dec. 27, 2013, the entire contents of which are incorporated herein by reference.

BACKGROUND (a) Field

The present invention generally relates to a security system of an information processing apparatus and a security control apparatus. In particular, the present invention relates to a security system including a mobile terminal and an information processing apparatus provided with a locking mechanism. The security system of the information processing apparatus of the present invention is configured to output an unlock instruction by using the mobile terminal.

(b) Description of the Related Art

In recent years, various information processing apparatuses have become widespread by the diversification of handling information. The information processing apparatus stores money or the equivalent of money on the inside. Alternatively, a value may be found in the information itself, or the information stored in the information processing apparatus may have a monetary value. The improvement for the security of the information processing apparatus storing the money or the monetary value has been required.

The information processing apparatus which stores the money or the equivalent of money has a cover or a door attached to the housing, or a drawer unit to be opened in order to allow the user to access the inside if necessary. The cover, door, or drawer unit of this information processing apparatus is provided with, for security reasons, a locking mechanism.

For example, Japanese Utility Model Application Publication No. H01-156055 discloses a printer whose cover cannot be opened without using a key to prevent information transcribed on an ink ribbon from being easily taken out. In a certain printer, the user can insert the key into a keyhole provided in the cover and turn the key, thereby detaching an engaging lever mounted on the cover from an engaging ring mounted on the housing such that the locking mechanism can be released. As such, various key locking mechanisms can be provided.

The key locking mechanisms for preventing someone from opening the cover by using the key are applied to other devices besides the printer. For example, a laptop computer described in Japanese Patent Application Publication No. 2004-046425 and a cash drawer described in Japanese Patent Application Publication No. S58-192196 use the key locking mechanisms.

The key locking mechanism can improve the security, but the key can be physically copied. Since the locking mechanism can be easily released if the key is copied, there is no longer the security function.

As such, the mechanisms that open and close the cover by the physical access are undesirable for security reasons. Therefore, information processing apparatuses using a locking mechanism that does not use the key have been proposed. For example, Japanese Patent Application Publication No. S63-141198 discloses that the locking mechanism of the cash drawer is released in accordance with the infrared communication from a POS (point or sale) device (or host).

In recent years, mobile terminals such as smart phones and tablets are popular, and the mobile terminal has been increasingly used as a host device of the information processing apparatus. Many mobile terminals can communicate with the information processing apparatus through a wireless or wired communication. Therefore, it is conceivable to issue an instruction for unlocking the information processing apparatus from the mobile terminal.

However, since the mobile terminal is capable to be carried, the mobile terminal located apart from the information processing apparatus can output the instruction for unlocking the information processing apparatus. Then, before the person that issued the instruction arrives at the location of the information processing apparatus, other people can access the inside of the information processing apparatus. Therefore, this mechanism is also undesirable for security reasons.

SUMMARY

The present invention reduces the chances of other people accessing the inside of an information processing apparatus when an unlocking instruction issued by a person by using a mobile terminal.

The present invention includes performing an authentication on whether the mobile terminal is a node that is permitted to output an unlock instruction, determining whether the mobile terminal is located within a predetermined distance from the information processing apparatus, and transmitting an unlock instruction signal only when the authentication is successful and further the mobile terminal is determined to be located within the predetermined distance from the information processing apparatus.

According to the present invention, even if the authentication is successful, a locking mechanism of the information processing apparatus cannot be released. Only after the mobile terminal is determined to be located within the predetermined distance from the information processing apparatus, the locking mechanism of the information processing apparatus can be released. Accordingly, when the mobile terminal is operated for an unlock instruction in a distance from the information processing apparatus, other people not carrying the mobile terminal is not allowed to access the inside of the information processing apparatus.

DETAILED DESCRIPTION

Figure 1:
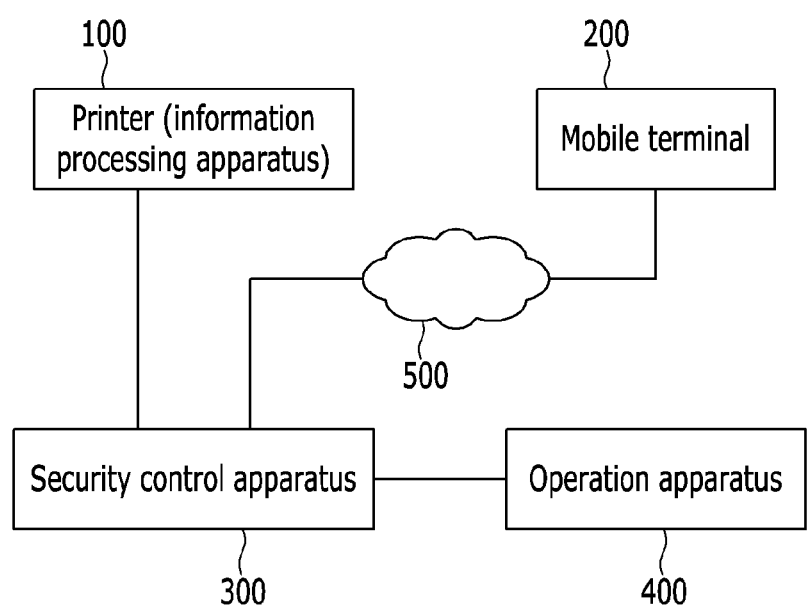
FIG. 1 is a schematic diagram exemplifying a security system of an information processing apparatus according to a first embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

First Embodiment

A first embodiment of the present invention is described with reference to the drawings. FIG. 1 is a schematic diagram exemplifying a security system of an information processing apparatus according to a first embodiment. Referring to FIG. 1, the security system according to the first embodiment includes a printer 100 corresponding to the information processing apparatus, a mobile terminal 200, a security control apparatus 300, and an operation apparatus 400. The security system according to the first embodiment is configured to unlock a locking mechanism provided in the printer 100 by using the mobile terminal 200.

The printer 100 and the security control apparatus 300 are connected by an interface cable such as a Universal Serial Bus (USB), a serial cable or Ethernet. The security control apparatus 300 and the operation apparatus 400 are also connected by the interface cable. In addition, the mobile terminal 200 and the security control apparatus 300 are connectable to each other via a wireless communication network 500 such as Bluetooth or Wi-Fi.

The operation apparatus 400 is placed at such a position as a user of the mobile terminal 200 can see whether there are other people in the vicinity of the operation apparatus 400 when the user of the mobile terminal 200 wirelessly issues an unlock instruction to the security control apparatus 300. In one embodiment, the interface cable for connecting the security control apparatus 300 and the operation apparatus 400 may be a short cable, for example, of several tens of centimeters. In addition, the operation apparatus 400 is placed at such a position as the user of the mobile terminal 200 can see whether there are other people in the vicinity of the printer 100 to be unlocked when the user of the mobile terminal 200 operates the operation apparatus 400. The operation apparatus 400 may be positioned within a predetermined distance from the printer 100. In one embodiment, the interface cable for connecting the printer 100 and the security control apparatus 300 may be a short cable, for example, of several tens of centimeters so that the operation apparatus 400 may be arranged within, for example, several tens of centimeters from the printer 100.

Figure 2:
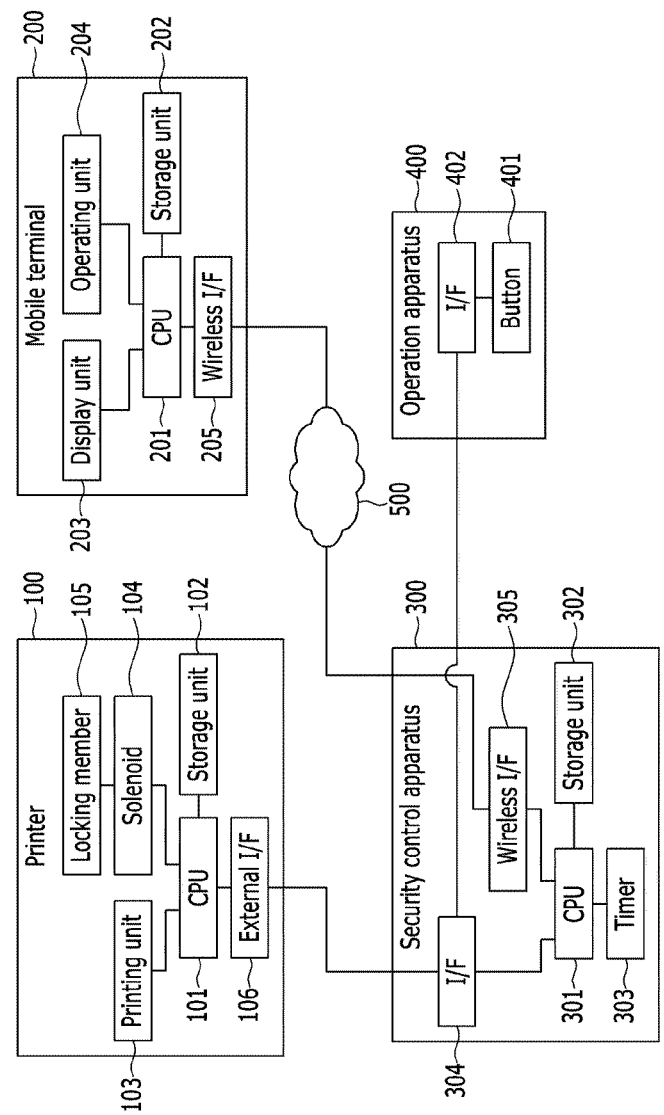
FIG. 2 is a block diagram exemplifying the security system of the information processing apparatus according to the first embodiment.

FIG. 2 is a block diagram exemplifying the security system of the information processing apparatus according to the first embodiment. Referring to FIG. 2, the printer 100 includes a processor 101, a storage unit 102, a printing unit 103, a solenoid 104, a locking member 105, and an external interface (I/F) 106. The processor 101 may include one or more physical processors, and the physical processor may be for example a Central Processing Unit (CPU). Hereinafter, it is assumed that the processor 101 is the CPU. The CPU 101 controls an operation of the printer 100 in accordance with programs stored in the storage unit 102 including a Read Only Memory (ROM) or a Random Access Memory (RAM). The locking member 105, for example, includes an engaging lever and an engaging pin.

The printer 100 includes a main body having a paper tray for holding paper and a cover for restricting access to the paper tray. The engaging lever is provided on the cover, and the engaging lever is engaged with the engaging pin provided in the main body. The engaging lever is connected to the solenoid 104. When the solenoid 104 is turned on, the engaging lever is detached from the engaging pin to open the cover. Thus, the locking mechanism of the printer 100 is constituted by the solenoid 104 and the locking member 105. In another embodiment, the engaging lever may be provided on the main body, and the engaging pin may be provided on the cover.

For example, the mobile terminal 200 may be a smart phone or a tablet. The mobile terminal includes a processor 201, a storage unit 202, a display unit 203, an operating unit 204, and a wireless interface 205. The storage unit 202 may include a ROM, a RAM, a hard disk or the like. The processor 201 may include one or more physical processors, and the physical processor may be for example a CPU. Hereinafter, it is assumed that the processor 201 is the CPU. The CPU 201 controls an operation of the mobile terminal 200 in accordance with programs stored in the storage unit 202. The display unit 203 and the operating unit 204 may be, for example, a touch panel display.

The security control apparatus 300 includes a processor 301, a storage unit 302 including a ROM or a RAM, a timer 303, an interface 304, and a wireless interface 305. The processor 301 may include one or more physical processors, and the physical processor may be for example a Central Processing Unit (CPU). Hereinafter, it is assumed that the processor 301 is the CPU. The CPU 301 controls an operation of the security control apparatus 300 in accordance with programs stored in the storage unit 302. The timer 303 measures an elapsed time after a monitoring mode to be described later is set.

The operation apparatus 400 includes a button 401 and an interface 402. The button 401 is pressed by the user to open the cover of the printer 100. When the button 401 is pressed, a pressing signal is outputted to the security control apparatus 300 via the interface 402.

The external interface 106 of the printer 100 is connected to the interface 304 of the security control apparatus 300 through the interface cable. Accordingly, the printer 100 can communicate with the security control apparatus 300. In the present embodiment, when the CPU 301 of the security control apparatus 300 determines that a predetermined condition is satisfied, the security control apparatus 300 transmits an unlock instruction signal to the printer 100.

The interface 304 of the security control apparatus 300 is also connected to the interface 402 of the operation apparatus 400 via the interface cable. Accordingly, the security control apparatus 300 can communicate with the operation apparatus 400. In the present embodiment, as described above, when the user presses the button 401, the operation apparatus 400 transmits the pressing signal to the security control apparatus 300.

The wireless interface 205 of the mobile terminal 200 is connected to the wireless interface 305 of the security control apparatus 300 via the wireless communication network 500. Accordingly, a wireless communication can be performed between the mobile terminal 200 and the security control apparatus 300. In the present embodiment, the mobile terminal 200 transmits to the security control apparatus 300 identification information of the mobile terminal 200 or its user (hereinafter referred to as "terminal identification information") together with the unlock instruction signal.

Figure 3:
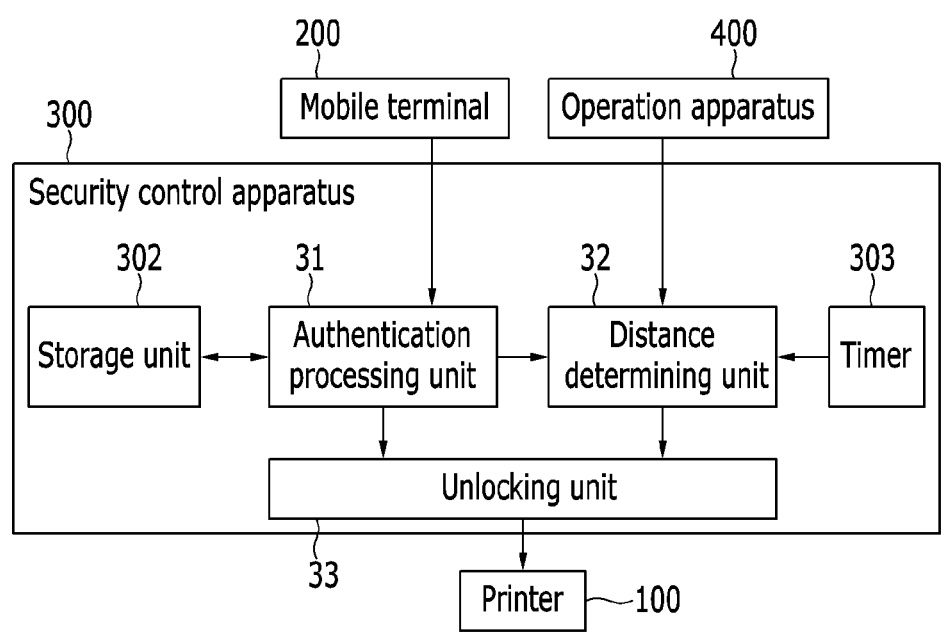
FIG. 3 is a block diagram exemplifying a functional structure of the security control apparatus according to the first embodiment.

FIG. 3 is a block diagram exemplifying a functional structure implemented by the CPU 301 of the security control apparatus 300. FIG. 3 shows a part of the hardware structure shown in FIG. 2. Referring to FIG. 3, the security control apparatus 300 includes an authentication processing unit 31, a distance determining unit 32, and an unlocking unit 33.

The authentication processing unit 31 authenticates whether the mobile terminal 200 or its user that outputs an unlock instruction is a node that is permitted to output the unlock instruction. In one embodiment, the authentication processing unit 31 performs authentication by comparing terminal identification information sent from the mobile terminal 200 with terminal identification information stored in the storage unit 302.

The terminal identification information may include information for uniquely identifying the mobile terminal 200 or its user. The storage unit 202 of the mobile terminal 200 stores the terminal identification information. When the user of the mobile terminal 200 instructs to unlock the printer 100 by operating the operating unit 204, the CPU 201 reads the terminal identification information from the storage unit 202, and transmits the terminal identification information and the unlock instruction signal to the security control apparatus 300 through the wireless interface 205.

Meanwhile, the storage unit 302 of the security control apparatus 300 previously stores identification information of one or more mobile terminals 200 or their users that are permitted to issue the unlock instruction. In one embodiment, the mobile terminal 200 on which a security administrator dedicated application is installed is connected to the security control apparatus 300, and then the terminal identification information may be transmitted to the security control apparatus 300 by an input via the operating unit 204. One or more terminal identification information can be thus stored in the storage unit 302.

It has been described that the storage unit 302 of the security control apparatus 300 previously stores the identification information of one or more mobile terminals 200 or their users that are permitted to issue the unlock instruction. However, the present invention is not limited thereto. In another embodiment, while the security control apparatus 300 is connected to a cloud server on the internet, the identification information of the mobile terminal 200 or its user may be previously stored in the cloud server. In this case, the identification information may be sent to the cloud server from the mobile terminal 200 via the security control apparatus 300. In yet another embodiment, the identification information may be directly transmitted to the cloud server from the mobile terminal 200. In still another embodiment, a server on the intranet may be used instead of the cloud server on the internet.

The authentication processing unit 31 determines whether the terminal identification information transmitted from the mobile terminal 200 matches with any one of the one or more terminal identification information that are previously stored in the storage unit 302. An authentication is successful if the transmitted terminal identification information matches with any one of the terminal identification information stored in the storage unit 302. The authentication is unsuccessful if the transmitted terminal identification information does not match with any one of the terminal identification information stored in the storage unit 302. The authentication processing unit 31 notifies the authentication result to the distance determining unit 32 and the unlocking unit 33.

The distance determining unit 32 determines whether the mobile terminal 200 comes within a predetermined distance from the printer 100. In the first embodiment, when the button 401 of the operation apparatus 400 is pressed, that is, when the pressing signal is sent to the security control apparatus 300 from the operation apparatus 400, the distance determining unit 32 determines that the mobile terminal 200 comes within the predetermined distance from the printer 100. As described above, since the operation apparatus 400 is located within the predetermined distance from the printer 100, pressing the button 401 by the user carrying the mobile terminal 200 means that the mobile terminal 200 comes within the predetermined distance from the printer 100.

The unlocking unit 33 transmits the unlock instruction signal to the printer 100 when the authentication processing unit 31 succeeds in the authentication and further the distance determining unit 32 determines that the mobile terminal 200 comes within the predetermined distance from the printer 100. When the printer 100 receives the unlock instruction signal, the CPU 101 turns on the solenoid 104. As a result, the engaging lever of the locking member 105 is released from the engaging pin. A spring (not shown) is mounted on the cover of the printer 100 in a manner to be urged toward the main body in the printer 100. Therefore, when the engaging lever is released from the engaging pin, the cover of the printer 100 is opened by the force of the spring.

It has been described that the cover of the printer 100 is opened by the force of the spring when the engaging lever is released from the engaging pin. However, the present invention is not limited thereto. In another embodiment, instead of providing the spring on the printer cover, the spring may be attached to the main body in a manner to be urged toward the printer cover. In yet another embodiment, instead of using the spring, when engaging lever is released from the engaging pin, the user may manually open the printer cover.

In the present embodiment, when the successful authentication is notified from the authentication processing unit 31, the distance determining unit 32 enters a monitoring mode to monitor whether the operation apparatus 400 is operated. If the authentication processing unit 31 fails in the authentication, the distance determination unit 32 does not enter the monitoring mode. The distance determining unit 32 measures the time elapsed since the start of the monitoring mode by using the timer 303, and cancels the monitoring mode if the operation of the operation apparatus 400 is not detected within a predetermined time. The distance determining unit 32 determines that the mobile terminal 200 comes within the predetermined distance from the printer 100 only when the operation of the operation apparatus 400 is detected during the monitoring mode.

In the monitoring mode, when the distance determining unit 32 receives the pressing signal from the operation apparatus 400, the unlocking unit 33 outputs the unlock instruction signal 33 to the printer 100. When the monitoring mode is not set, any pressing signal from the operation apparatus 400 is ignored. In this case, the unlocking unit 33 ignores and discards the unlock instruction signal received from the mobile terminal 200, and does not output the unlock instruction signal to the printer 100.

By providing the monitoring mode, the printer 100 cannot be unlocked unless the button 401 is pressed within the predetermined time after the unlock instruction is sent from the mobile terminal 200. Accordingly, even if the user forgets to press the button 401 after the authentication, the printer 100 cannot be unlocked after the predetermined time has elapsed. Security is thereby improved.

In addition, the user may arbitrarily set the time during which the user presses the button 401 after the mobile terminal 200 performs the unlock instruction.

Figure 4:
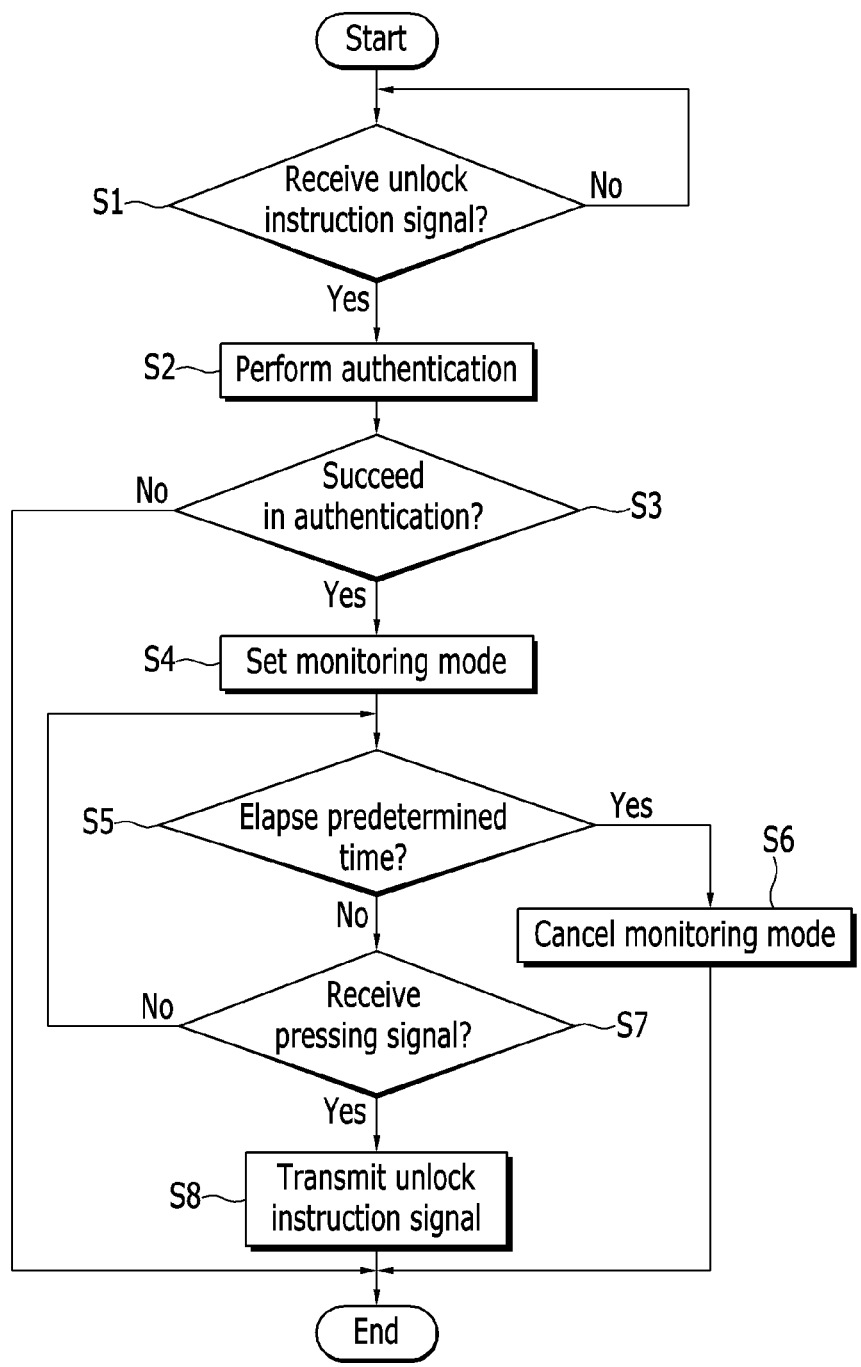
FIG. 4 is a flowchart showing an operation example of the security control apparatus according to the first embodiment.

FIG. 4 is a flowchart showing an operation example of the security control apparatus 300 shown in FIG. 3. If the user wants to open the cover of the printer 100, the user first operates the mobile terminal 200 to issue an unlocking instruction. Then, the mobile terminal 200 transmits to the security control apparatus 300 the unlock instruction signal along with the terminal identification information.

The authentication processing unit 31 of the security control apparatus 300 determines whether it receives the unlock instruction signal and the terminal identification information (step S1). If failing to receive the unlock instruction signal and the terminal identification information, the authentication processing unit 31 repeatedly executes the determination of the step S1. On the other hand, if the authentication processing unit 31 receives the unlock instruction signal and the terminal identification information, it compares the terminal identification information transmitted from the mobile terminal 200 with terminal identification information previously stored in the storage unit 302, thereby performing authentication (step S2).

Next, the distance determining unit 32 determines whether the authentication by the authentication unit 31 is successful, based on notification from the authentication processing unit 31 (step S3). If it is determined that the authentication fails, the process shown in FIG. 4 is terminated. On the other hand, if the distance determining unit 32 determines that the authentication is successful, it enters the monitoring mode to monitor whether the operation of the operation apparatus 400 is performed (step S4).

Then, the distance determining unit 32 determines whether a predetermined time has elapsed after entering the monitoring mode (step S5). If the distance determination unit 32 determines that the predetermined time has elapsed, it cancels the monitoring mode (step S6). Thus, the process shown in FIG. 4 is terminated. On the other hand, if the distance determining unit 32 determines that the predetermined time has not been elapsed after entering the monitoring mode, it further determines whether a pressing signal is sent from the operation apparatus 400 (step S7).

If the distance determining unit 32 does not receive the pressing signal from the operation apparatus 400, the process returns to step S5. On the other hand, if the distance determining unit 32 receives the pressing signal from the operation apparatus 400, that is, if it is determined that the mobile terminal 200 comes within a predetermined distance from the printer 100, the unlocking unit 33 sends the unlock instruction signal to the printer 100 in response to the unlocking instruction signal received from the mobile terminal 200 (step S8). Thus, the engaging lever of the locking member 105 is released from the engaging pin, and then the cover of the printer 100 is opened by the force of the spring (not shown) attached to the cover.

As described above in detail, in the first embodiment, the authentication is performed by the security control apparatus 300 based on the terminal identification information sent from the mobile terminal 200 together with the unlock instruction, and then determination is done by the security control apparatus 300 whether the mobile terminal 200 comes within the predetermined distance from the printer 100 by monitoring the pressing signal of the button 401 sent from the operation apparatus 400. Then, only when the authentication succeeds and further the mobile terminal 200 is determined to come within the predetermined distance from the printer 100, the unlock instruction signal can be outputted to the printer 100.

According to the first embodiment, even if the authentication of the mobile terminal 200 or its user is successful, the locking mechanism of the printer 100 cannot be released. Only when it is further determined that the mobile terminal 200 comes within the predetermined distance from the printer 100, the locking mechanism of the printer 100 can be released. Accordingly, even if the mobile terminal 200 is operated for the unlocking instruction at a distance from the printer 100, another person not carrying the mobile terminal 200 is not allowed to access the inside of the printer 100.

It has been described in the above first embodiment that functions of the authentication processing unit 31, the distance determining unit 32, and the unlocking unit 33 shown in FIG. 3 are provided in the security control apparatus 300. However, the present invention is not limited thereto. In one embodiment, those functions may be provided in the printer 100. In this case, the security control apparatus 300 is unnecessary. In another embodiment, in the case that the security control apparatus 300 is provided, even if the unlock instruction signal is issued to the conventional printer 100 having no wireless interface, the printer 100 can be unlocked.

Figure 5:
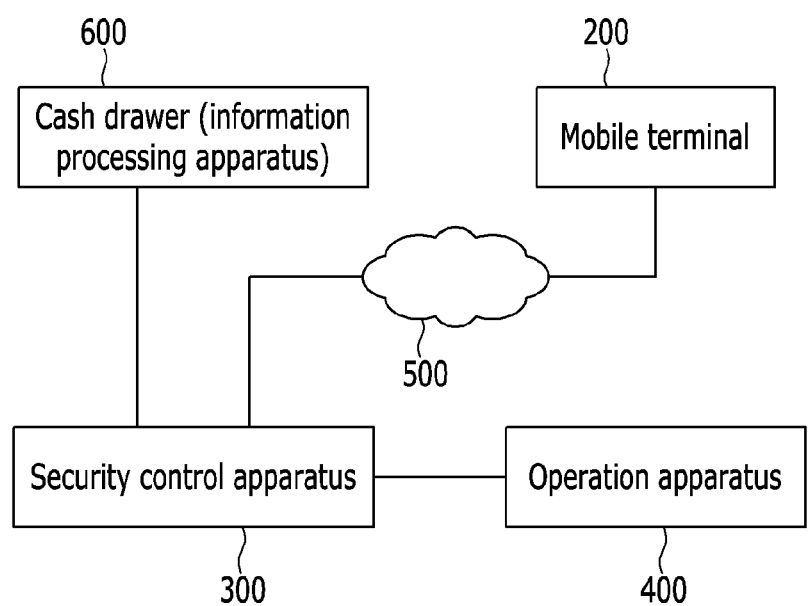
FIG. 5 is a schematic diagram showing a substituted example of the security system of the information processing apparatus according to the first embodiment.
Figure 6:
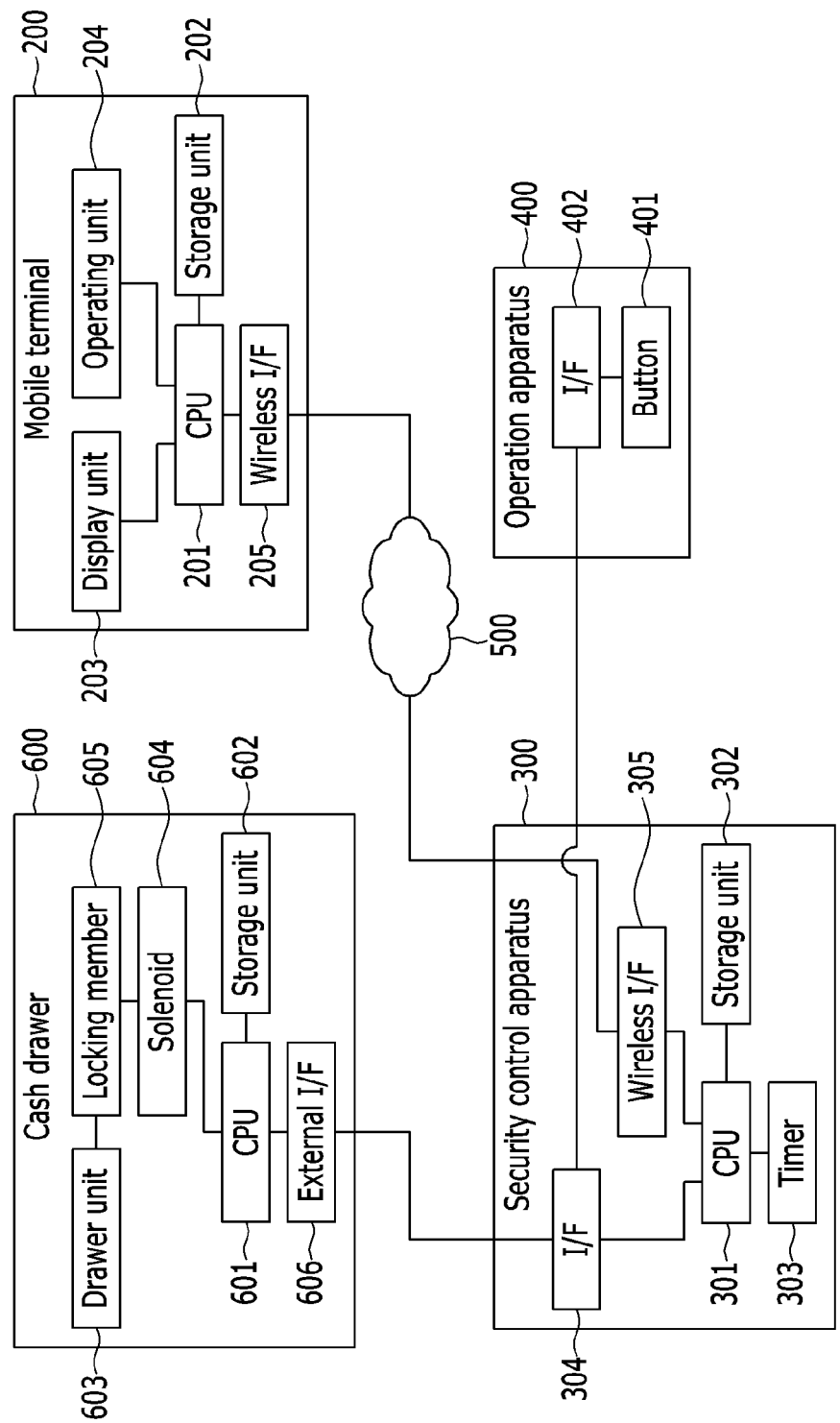
FIG. 6 is a block diagram showing a substituted example of the security system of the information processing apparatus according to the first embodiment.

Further, it has been described in the above first embodiment that the printer 100 is exemplified as an example of the information processing apparatus, but the present invention is not limited thereto. In a substituted embodiment, as shown in FIG. 5, a cash drawer 600 may be used instead of the printer 100. FIG. 6 is a block diagram exemplifying the security system in case of using the cash drawer 600. In FIG.

6, since blocks denoted by the same reference numbers as shown in FIG. 2 have the same functions as blocks of FIG. 2, duplicated description will be omitted.

As shown in FIG. 6, the cash drawer 600 includes a CPU 601, a storage unit 602, a drawer unit 603, a solenoid 604, a locking member 605, and an external interface 606. The CPU 601 controls an operation of the cash drawer 600 in accordance with programs stored in the storage unit 602 including a ROM or a RAM. The locking member 605, for example, includes an engaging lever and an engaging pin.

The cash drawer 600 includes the drawer unit 603 for receiving money and a main body for accommodating the drawer unit 603. The drawer unit 603 is provided with the engaging lever, and the engaging lever is engaged with the engaging pin of the main body. The engaging lever is connected to the solenoid 604. When the solenoid 604 is turned on in response to an unlock instruction signal sent from the security control unit 300, the engaging lever is detached from the engaging pin. Specifically, a spring is mounted on the drawer unit 603 in a manner to be urged toward an opposite direction to a direction in which the drawer unit 603 is pulled out. Then, when the engaging lever is released from the engaging pin, the drawer unit 603 can be opened by the force of the spring. In another embodiment, the engaging lever may be provided on the main body, and the engaging pin may be provided on the drawer unit 603.

Furthermore, it has been described above that the cash drawer 600 includes the CPU 601 and the storage unit 602, but the present invention is not limited thereto. In one embodiment, without providing the CPU 601 and the storage unit 602 to the cash drawer 600, the solenoid 604 may be connected to the external interface 606 and may be turned on by the unlock instruction signal transmitted from the security control apparatus 300.

Moreover, it has been described in an example shown in FIG. 6 that the engaging lever of the locking member 605 is detached from the engaging pin by the turn-on of the solenoid 604. However, the present invention is not limited thereto. In one embodiment, an actuator may be used instead of the solenoid 604. In this case, the CPU 601 may turn on the actuator in response to the unlock instruction signal sent from the security control apparatus 300 such that the engaging lever of the locking member 605 can be detached from the engaging pin.

In addition, it has been described in the first embodiment that the button 401 is mounted on the operation apparatus 400, but the present invention is not limited thereto. In one embodiment, a key may be used instead of the button 401. In other words, an operation for turning the key or an operation for inserting the key may be used as a trigger instead of the operation for pressing the button 401. Further, the embodiment is not limited to the key. In another embodiment, a lever or a switch may be used instead of the key.

Second Embodiment

Figure 7:
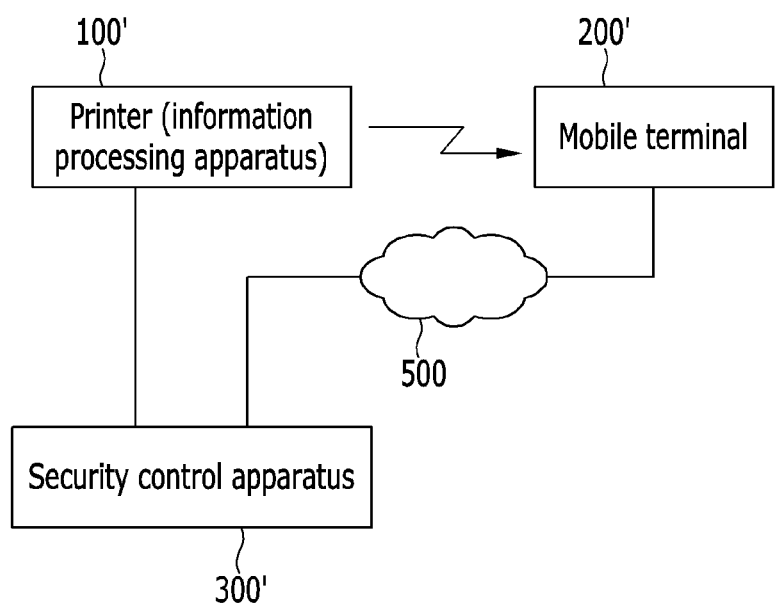
FIG. 7 is a schematic diagram exemplifying the security system of the information processing apparatus according to a second embodiment.

A second embodiment of the present invention is described with reference to the drawings. FIG. 7 is a schematic diagram exemplifying the security system of the information processing apparatus according to the second embodiment. Referring to FIG. 7, the security system according to the second embodiment includes a printer 100' corresponding to the information processing apparatus, a mobile terminal 200', and a security control apparatus 300'.

The printer 100' and the security control apparatus 300' are connected by the interface cable. The mobile terminal 200' and the security control apparatus 300' are connectable to each other via the wireless communication network 500. In addition, the printer 100' and the mobile terminal 200' perform a wireless communication by short-range wireless communication means such as Near Field Communication (NFC).

Figure 8:
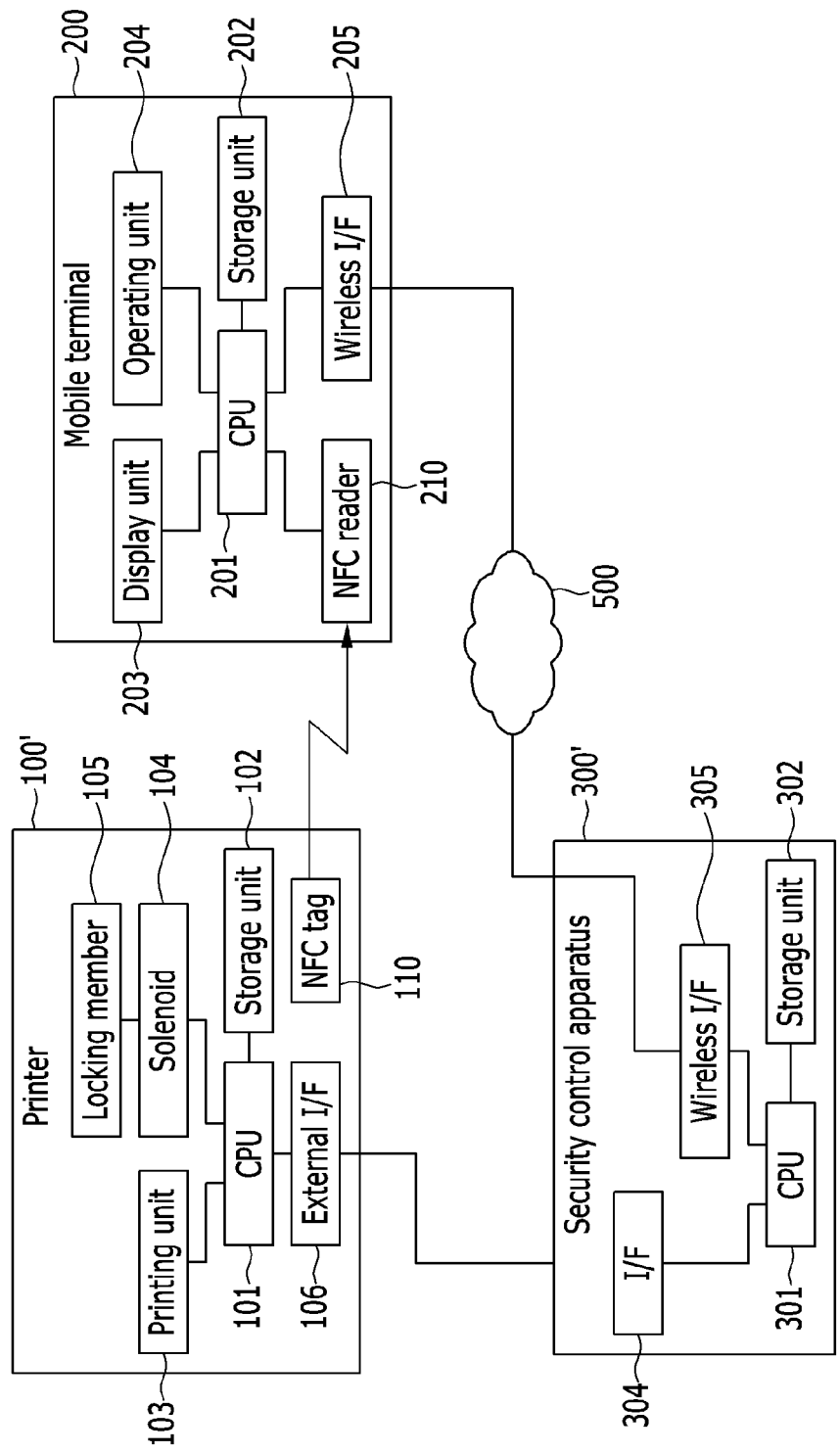
FIG. 8 is a block diagram exemplifying the security system of the information processing apparatus according to the second embodiment.

FIG. 8 is the block diagram exemplifying the security system of the information processing apparatus according to the second embodiment. In FIG. 8, since blocks denoted by the same reference numbers as shown in FIG. 2 have the same functions as blocks of FIG. 2, duplicated description will be omitted.

As shown in FIG. 8, the printer 100' includes the CPU 101, the storage unit 102, the printing unit 103, the solenoid 104, the locking member 105, the external interface 106, and an NFC tag 110. The NFC tag 110 stores predetermined information in an internal memory. The NFC tag 110 is, for example, a seal to be put on a surface of a housing of the printer 100'.

The predetermined information stored in the internal memory of the NFC tag 110 is used to provide a trigger for outputting the unlock instruction signal when the mobile terminal 200' reads the predetermined information. The contents of the predetermined information may be arbitrarily determined. For example, the identification information of the printer 100' (e.g., a serial number) may be used as the predetermined information.

The mobile terminal 200' includes the CPU 201, the storage unit 202, the display unit 203, the operating unit 204, the wireless interface 205, and an NFC reader 210. The NFC reader 210 acquires printer identification information stored in the NFC tag 110 of the printer 100' by NFC.

In general, the communication distance of NFC is less than 10 cm. Accordingly, the mobile terminal 200' is required to be close to the printer 100' in order to allow the NFC reader 210 to obtain the printer identification information from the NFC tag 110 attached to printer 100'. That is, the NFC reader 210 can acquire the printer identification information from the NFC tag 110 by placing the mobile terminal 200' close to the NFC tag 110 of the printer 100'.

The security control apparatus 300' includes the CPU 301, the storage unit 302, the interface 304, and the wireless interface 305. In the second embodiment, since the monitoring mode is not set, the timer 303 of FIG. 2 that is used to measure a setting time of the monitoring mode in the first embodiment is not necessary.

Figure 9:
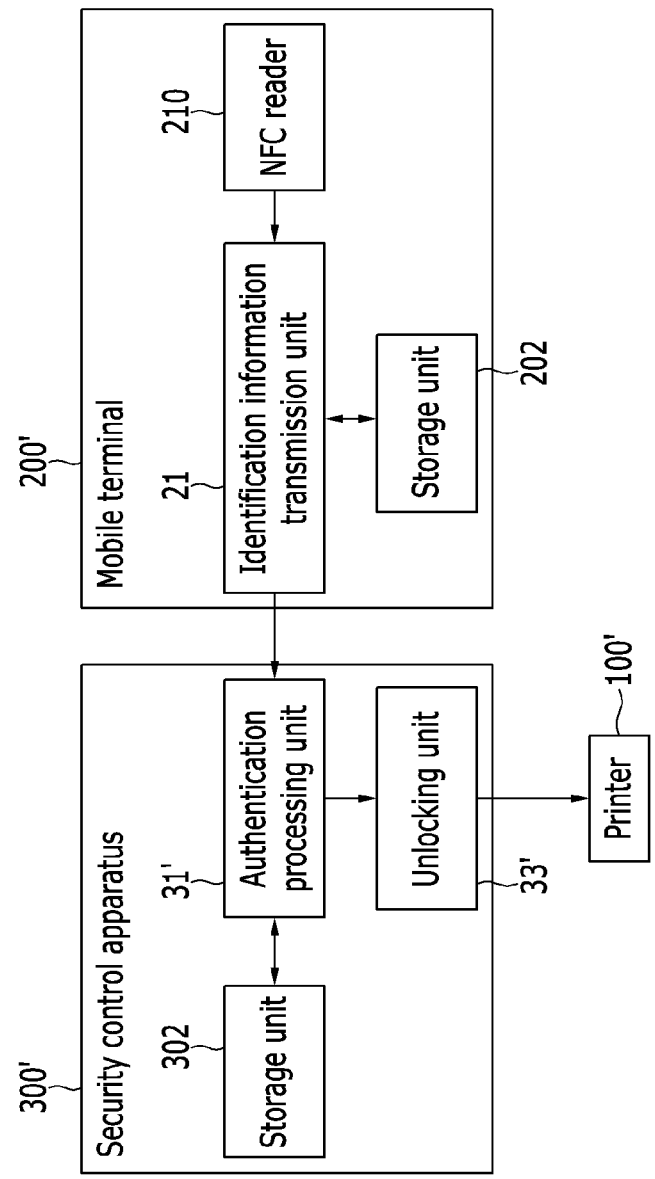
FIG. 9 is a block diagram exemplifying a functional structure of a mobile terminal and the security control apparatus according to the second embodiment.

FIG. 9 is a block diagram exemplifying a functional structure of the mobile terminal 200' and the security control apparatus 300' according to the second embodiment. As shown in FIG. 9, the mobile terminal 200' includes an identification information transmitting unit 21. In addition, the security control apparatus 300' includes an authentication processing unit 31' and an unlocking unit 33'.

Upon reading the printer identification information stored in the NFC tag 110 of the printer 100' by the NFC reader 210, the identification information transmitting unit 21 of the mobile terminal 200' reads terminal identification information of the mobile terminal 200' or its user from the storage unit 202, and transmits to the security control apparatus 300' the terminal identification information along with an unlock instruction signal.

The authentication processing unit 31' of the security control unit 300' serves both a function of the authentication processing unit 31 and a function of the distance determining unit 32 described in the first embodiment. That is, the authentication processing unit 31' may determine that the mobile terminal 200' comes within a predetermined distance from the printer 100' when receiving the terminal identification information and the unlock instruction signal from the mobile terminal 200' brought close to the NFC tag 110 of the printer 100'.

As described above, if the mobile terminal 200' is not brought close to the printer 100' to read the information of the NFC tag 110, the unlock instruction signal and the terminal identification information are not sent to the security control apparatus 300'. Accordingly, when the authentication processing unit 31' receives the unlock instruction signal, it can be determined that the mobile terminal 200' comes within the predetermined distance from the printer 100'.

The authentication processing unit 31' performs authentication by comparing the terminal identification information transmitted from the mobile terminal 200' with the terminal identification information that is previously stored in storage unit 302. Upon succeeding in the authentication, the authentication processing unit 31' notifies the unlocking unit 33' of the authentication result.

The unlocking unit 33' transmits the unlock instruction signal to the printer 100' when the authentication processing unit 31' succeeds in the authentication (and determines at the same time that the mobile terminal 200' comes within the predetermined distance from the printer 100'). When the printer 100' receives the unlock instruction signal, the CPU 101 turns on the solenoid 104. As a result, the engaging lever of the locking member 105 is released from the engaging pin by the force of a spring (not shown) attached to the cover, and then the cover of the printer 100' is opened.

Figure 10:
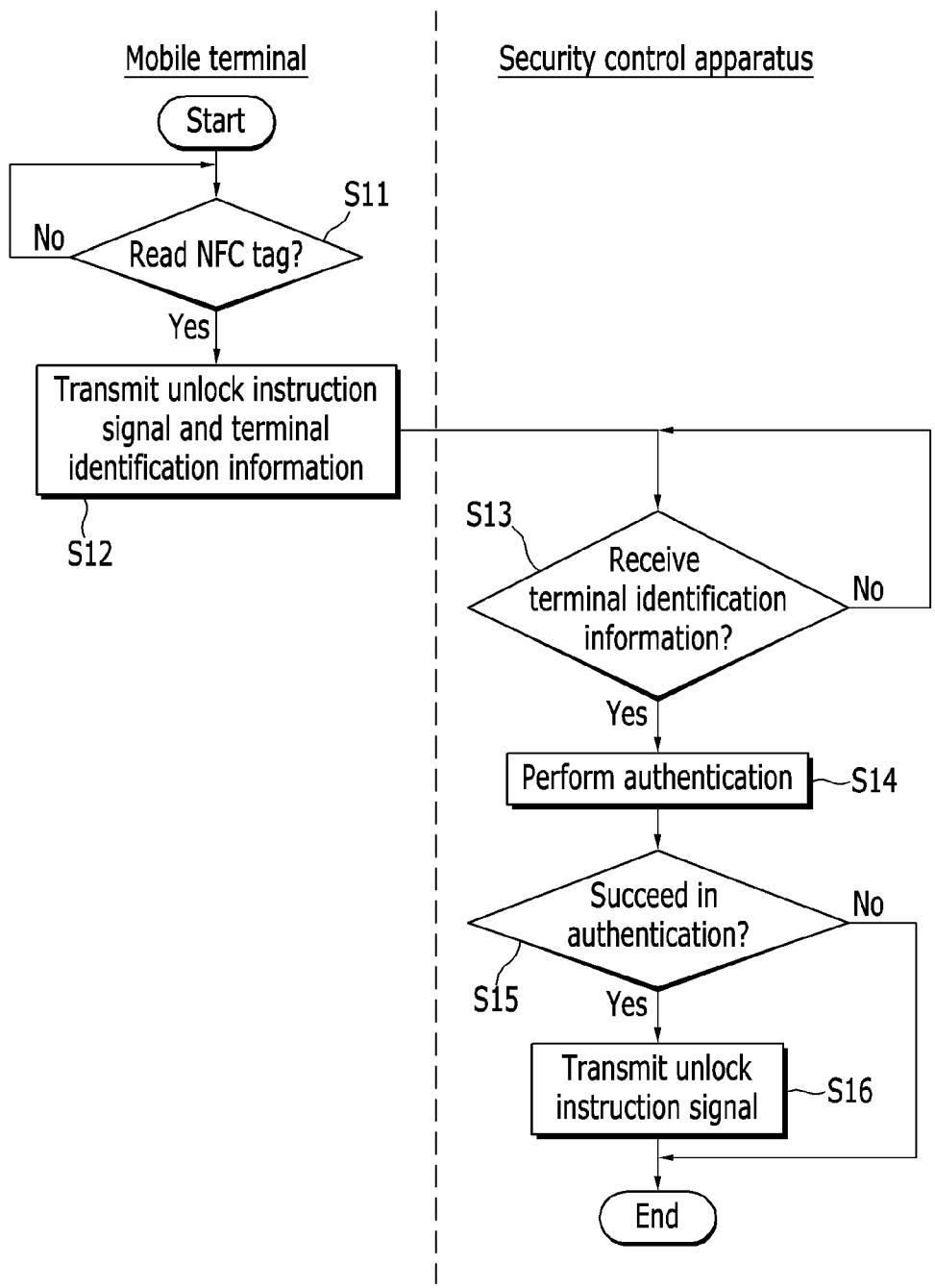
FIG. 10 is a flowchart showing an operation example of the mobile terminal and the security control apparatus according to the second embodiment.

FIG. 10 is a flowchart showing an operation example of the mobile terminal 200' and the security control apparatus 300' shown in FIG. 9. If the user wants to open the cover of the printer 100', the user brings the mobile terminal 200' close to the NFC tag 110 attached to the printer 100'. The identification information transmitting unit 21 of the mobile terminal 200' determines whether the NFC reader 210 reads the printer identification information from the NFC tag 110 (step S11).

If it is determined that the NFC reader 210 reads the printer identification information, the identification information transmitting unit 21 transmits to the security control apparatus 300' the terminal identification information and an unlock instruction signal (step S12). The authentication processing unit 31' of the security control apparatus 300' determines whether the unlock instruction signal and the terminal identification information is received (step S13). If failing to receive the unlock instruction signal and the terminal identification information, the authentication processing unit 31' repeatedly executes the determination of the step S13.

On the other hand, if the authentication processing unit 31' receives the unlock instruction signal and the terminal identification information, it compares the terminal identification information transmitted from the mobile terminal 200' with terminal identification information previously stored in the storage unit 302, thereby performing authentication (step S14). Subsequently, the unlocking unit 33' determines whether the authentication is successful, based on notification from the authentication processing unit 31' (step S15).

If it is determined that the authentication fails, the process shown in FIG. 10 is terminated. On the other hand, if the unlocking unit 33' determines that the authentication succeeds, it transmits an unlock instruction signal to the printer 100' in response to the unlock instruction signal received from the mobile terminal 200' (step S16). As a result, the cover of the printer 100' is opened.

As described above in detail, in the second embodiment, the authentication is performed by the security control apparatus 300' based on the terminal identification information sent from the mobile terminal 200 together with the unlock instruction signal when the mobile terminal 200' is brought close to the printer 100'. Since it has been confirmed that the mobile terminal 200' comes within the predetermined distance from the printer 100' when the unlock instruction signal is received, the security control apparatus 300' can output the unlock instruction signal to the printer 100' when the authentication succeeds.

According to the second embodiment, when the user places the mobile terminal 200' close to the printer 100', the authentication is performed. Unless the authentication succeeds, the locking mechanism of the printer 100' is not released. In other words, since the unlocking operation cannot be performed by the mobile terminal 200' at a distance from the printer 100', another person not carrying the mobile terminal 200' is not allowed to access the inside of the printer 100'.

It has been described in the above second embodiment that functions of the authentication processing unit 31' and the unlocking unit 33' shown in FIG. 9 are provided in the security control apparatus 300'. However, the present invention is not limited thereto. In one embodiment, those functions may be provided in the printer 100'. In this case, the security control apparatus 300' is unnecessary. In another embodiment, in the case that the security control apparatus 300' is provided, the NFC tag 110 can be attached to a surface of the conventional printer 100' having no wireless interface, and therefore the conventional printer does not need to be switched into a new printer having the wireless interface.

Furthermore, it has been described in the above second embodiment that the NFC tag 110 is a seal, but the present invention is not limited thereto. In one embodiment, an NFC tag with a wired terminal, i.e., an NFC tag with a connector that is connectable to the CPU 101 of the printer 100' may be used instead of the seal. In this case, the predetermined information stored in the internal memory of the NFC tag 110 can be freely rewritten by an instruction from the CPU 101.

Figure 11:
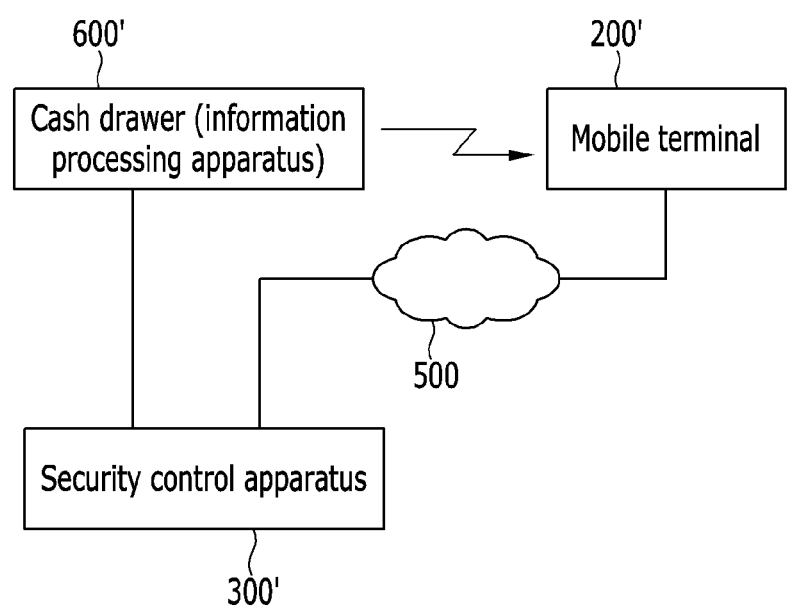
FIG. 11 is a schematic diagram showing a substituted example of the security system of the information processing apparatus according to the second embodiment.

In addition, it has been described in the above second embodiment that the printer 100' is exemplified as an example of the information processing apparatus. However, the present invention is not limited thereto. In a substituted embodiment, as shown in FIG. 11, a cash drawer 600' having a surface on which the NFC tag 110 is attached may be used instead of the printer 100'.

Moreover, it has been described in the above second embodiment that the printer 100' is provided with the NFC tag 110 and the mobile terminal 200' is provided with the NFC reader 210, but the present invention is not limited thereto. In one embodiment, the printer 100' may be provided with the NFC reader 210, the mobile terminal 200' may be provided with the NFC tag 110, and the identification information transmission unit 21 may be provided as the function of the printer 100'. In this case, the terminal identification information of the mobile terminal 200 or its user may be stored in the built-in memory of NFC tags 110. Further, when the NFC reader 210 of the printer 100' reads the terminal identification information from the NFC tag 110, the printer 100' may transmit to the security control apparatus 300' the terminal identification information read by the NFC reader 210 along with the unlock instruction signal.

In another embodiment, the security control apparatus 300' may be provided with the NFC tag 110 and the mobile terminal 200' may be provided with the NFC reader 210. In yet another embodiment, the security control apparatus 300' may be provided with the NFC reader 210 and the mobile terminal 200' may be provided with the NFC tag 110. In the latter case, the terminal identification information of the mobile terminal 200 or its user may be stored in the built-in memory of the NFC tags 110. Further, when the NFC reader 210 of the security control apparatus 300' reads the terminal identification information from the NFC tag 110, it may notify the authentication processing unit 31' of the terminal identification information.

Third Embodiment

Figure 12:
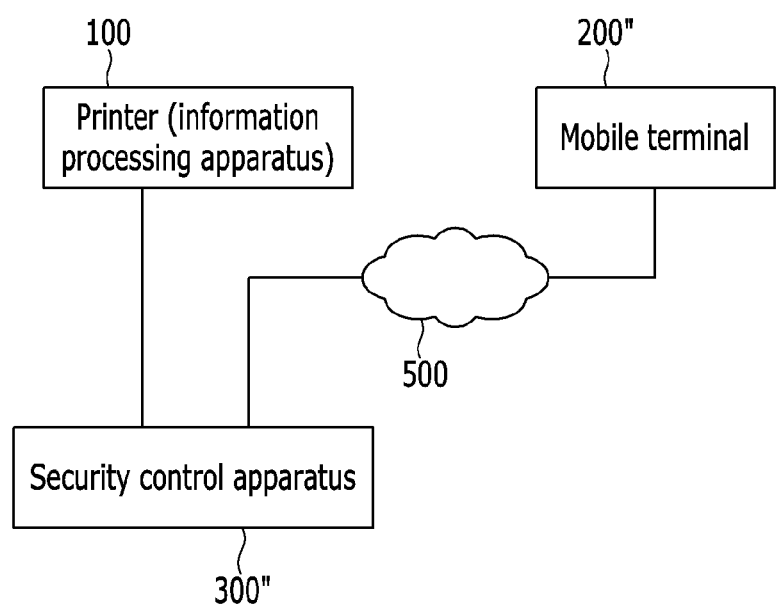
FIG. 12 is a schematic diagram exemplifying the security system of the information processing apparatus according to a third embodiment.

A third embodiment of the present invention is described with reference to the drawings. FIG. 12 is a schematic diagram exemplifying the security system of the information processing apparatus according to the third embodiment. Referring to FIG. 12, the security system according to the third embodiment includes the printer 100 corresponding to the information processing apparatus, a mobile terminal 200", and a security control apparatus 300".

The printer 100 and the security control apparatus 300" are connected by the interface cable. In addition, the mobile terminal 200" and the security control apparatus 300" are connectable to each other via the wireless communication network 500. In one embodiment, the interface cable for connecting the printer 100 and the security control apparatus 300" may be a short cable, for example, of several tens of centimeters, and the security control apparatus 300" may be arranged within a predetermined distance from the printer 100.

Figure 13:
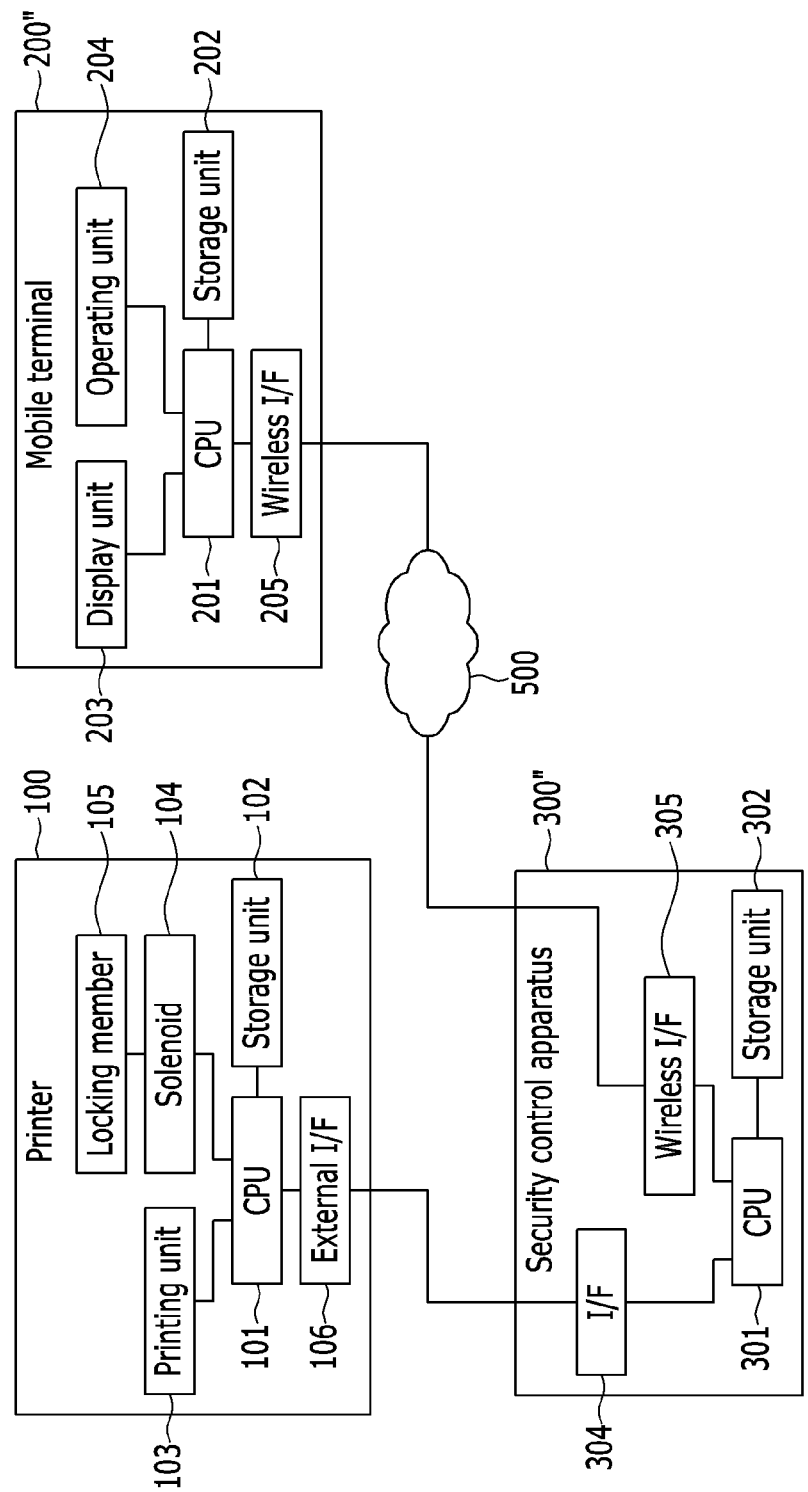
FIG. 13 is a block diagram exemplifying the security system of the information processing apparatus according to the third embodiment.

FIG. 13 is a block diagram exemplifying the security system of the information processing apparatus according to the third embodiment. In FIG. 13, since blocks denoted by the same reference numbers as shown in FIG. 2 have the same functions as blocks of FIG. 2, duplicated description will be omitted. In the third embodiment, since a monitoring mode is not set, the security control apparatus 300", as shown in FIG. 13, does not include the timer 303 shown in FIG. 2.

In the third embodiment, the wireless interface 205 of the mobile terminal 200" and the wireless interface 305 of the security control apparatus 300" may correspond to wireless communication units for allowing the mobile terminal 200" and the security control apparatus 300" to perform the short-range wireless communication.

Figure 14:
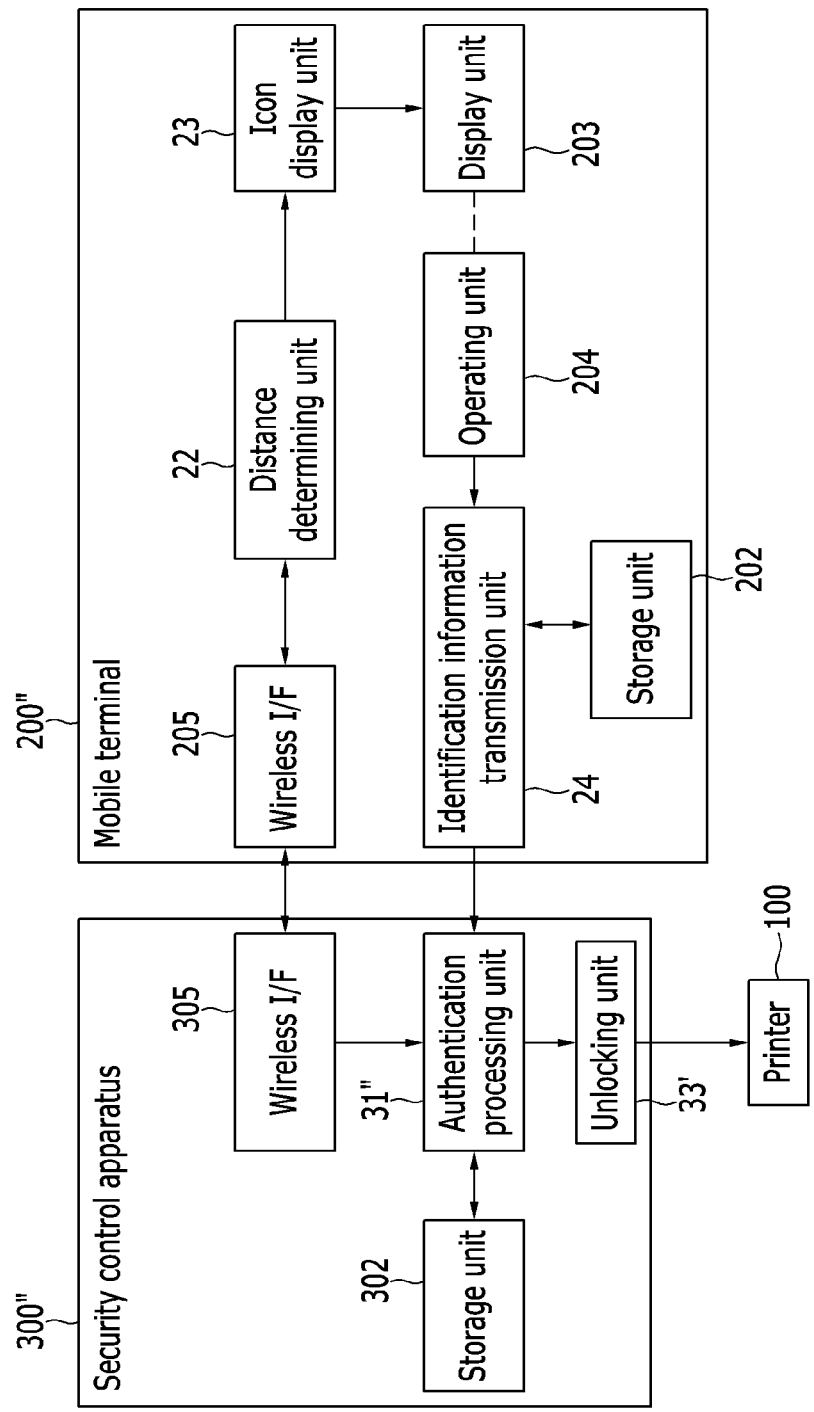
FIG. 14 is a block diagram exemplifying a functional structure of the mobile terminal and the security control apparatus according to the third embodiment.

FIG. 14 is a block diagram exemplifying a functional structure of the mobile terminal 200" and the security control apparatus 300" according to the third embodiment. FIG. 14 shows part of the blocks shown in FIG. 13. As shown in FIG. 14, the mobile terminal 200" includes a distance determining unit 22, an icon display unit 23, and an identification information transmitting unit 24. In addition, the security control apparatus 300" includes an authentication processing unit 31" and an unlocking unit 33".

The distance determining unit 22 of the mobile terminal 200" determines whether an electric field strength of a signal communicated between the wireless communication units (the wireless interfaces 205 and 305) of the mobile terminal 200" and the security control apparatus 300" is greater than a predetermined value. When the electric field strength is greater than the predetermined value, the distance determining unit 22 determines that the mobile terminal 200" comes within the predetermined distance from the printer 100. In some embodiments, the distance determining unit 22 may determine whether the electric field strength is greater than the predetermined value by determining whether the wireless interface 205 receives a radio wave emitted by the wireless interface 305 at a certain level or higher.

The icon display unit 23 corresponds to a notification unit according to embodiments of the present invention. When the distance determining unit 22 determines that the mobile terminal 200" comes within the predetermined distance from the printer 100, the icon display unit 23 displays an operation icon on the display unit 203. Displaying the operation icon on the display unit 203 can notify the user of the mobile terminal 200" that the mobile terminal 200" comes within the predetermined distance from the printer 100. The identification information transmitting unit 24, when the operation icon is operated by the operating unit 204, reads terminal identification information of the mobile terminal 200" or its user from the storage unit 202, and transmits to the security control apparatus 300" the identification information along with an unlock instruction signal.

The authentication processing unit 31" of the security control apparatus 300" performs the authentication by comparing the terminal identification information sent from the mobile terminal 200" with terminal identification information previously stored in the storage unit 302. Then, the authentication processing unit 31" notifies the unlocking unit 33" of the authentication result.

The unlocking unit 33" transmits the unlock instruction signal to the printer 100' when the authentication processing unit 31" succeeds in the authentication (in this case the mobile terminal 200" has confirmed that the mobile terminal 200" comes within the predetermined distance from the printer 100). When the printer 100 receives the unlock instruction signal, the CPU 101 turns on the solenoid 104. As a result, the engaging lever of the locking member 105 is released from the engaging pin by the force of a spring (not shown) attached to the cover, and then the cover of the printer 100 is opened.

Figure 15:
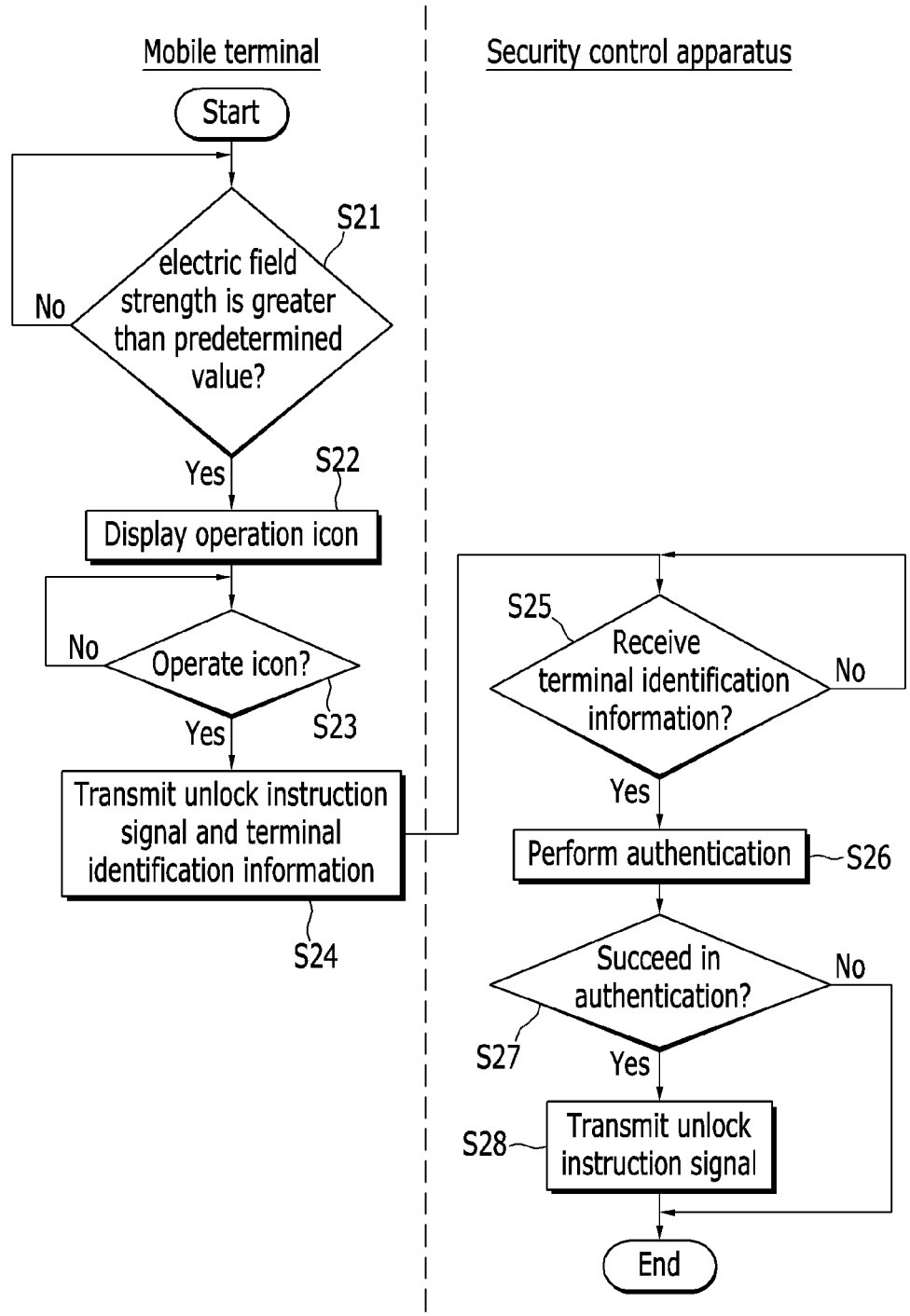
FIG. 15 is a flowchart showing an operation example of the mobile terminal and the security control apparatus according to the third embodiment.

FIG. 15 is a flowchart showing an operation example of the mobile terminal 200" and the security control apparatus 300" shown in FIG. 14. The user of the mobile terminal 200" approaches the security control apparatus 300" to open the cover of the printer 100. The distance determining unit 22 of the mobile terminal 200" determines whether an electric field strength of a signal being communicated with the security control apparatus 300" is greater than a predetermined value (step S21).

If the distance determining unit 22 determines that the electric field strength is greater than the predetermined value, the icon display unit 23 displays an operation icon on the display unit 203 (step S22). Next, the identification information transmitting unit 24 determines whether the operation icon is operated by the user (step S23). If the operation icon is not operated, the determination of step S23 is repeatedly executed.

On the other hand, if the operation icon is operated, the identification information transmitting unit 24 transmits to the security control apparatus 300" the unlock instruction signal along with the terminal identification information (step S24). The authentication processing unit 31" of the security control apparatus 300" determines whether to receive the unlock instruction signal and the terminal identification information (step S25). If failing to receive the unlock instruction signal and the terminal identification information, the authentication processing unit 31" repeatedly executes the determination of step S25.

On the other hand, if the authentication processing unit 31" receives the terminal identification information and the unlock instruction signal, it compares the terminal identification information transmitted from the mobile terminal 200" with terminal identification information previously stored in the storage unit 302, thereby performing authentication (step S26). Subsequently, the unlocking unit 33" determines whether the authentication is successful, based on notification from the authentication processing unit 31" (step S27).

If it is determined that the authentication fails, the process shown in FIG. 15 is terminated. On the other hand, if the unlocking unit 33" determines that the authentication succeeds, it transmits an unlock instruction signal to the printer 100 in response to the unlock instruction signal received from the mobile terminal 200" (step S28). As a result, the cover of the printer 100 is opened.

As described above in detail, in the third embodiment, when the electric field strength of the signal communicated between the mobile terminal 200" and the security control apparatus 300" reaches the predetermined value or more as the user carrying the mobile terminal 200" approaches the security control apparatus 300", the operation icon can be displayed in the mobile terminal 200". When the operation icon is operated, the mobile terminal 200" can transmit the unlock instruction signal and the terminal identification information to the security control apparatus 300", and the authentication can be performed. Since it is confirmed that the mobile terminal 200" comes within the predetermined distance from the printer 100 at the time when the mobile terminal 200" approaches the security control apparatus 300", the security control apparatus 300" can output the unlock instruction signal to the printer 100 when the authentication is successful.

According to the third embodiment, the operation icon for instructing the unlocking is not displayed until the user carrying the mobile terminal 200" approaches the security control apparatus 300", and the locking mechanism of the printer 100' cannot be released until the authentication is successfully done in response to the operation of the operation icon. In other words, since the unlock instruction cannot be issued by the mobile terminal 200" in a distance from the printer 100, another person not carrying the mobile terminal 200" is not allowed to access the inside of the printer 100.

It has been described in the above third embodiment that functions of the authentication processing unit 31" and the unlocking unit 33" shown in FIG. 14 are provided in the security control apparatus 300", but the present invention is not limited thereto. In one embodiment, those functions may be provided in the printer 100. In this case, the security control apparatus 300" is unnecessary. According to another embodiment, in the case that the security control apparatus 300" is provided, the conventional printer 100 having no wireless interface may be used, and therefore the conventional printer does not need to be switched into a new printer having the wireless interface.

Further, it has been described in the above third embodiment that displaying the operation icon notifies the user of the mobile terminal 200" that the mobile terminals 200" comes within the predetermined distance from the printer 100. However, the present invention is not limited thereto. In one embodiment, image data and text data may be displayed as a pop-up window to indicate that the mobile terminal 200" comes within the predetermined distance. In another embodiment, it may be notified to the user by switching a screen displayed in the mobile terminal 200". In yet another embodiment, it may be notified to the user by outputting a predetermined music or blinking a light emitting diode (LED).

Furthermore, it has been described in the above third embodiment that the operation icon is operated by the operating unit 204 of the mobile terminal 200", but the present invention is not limited thereto. In one embodiment, a predetermined key code may be inputted or a predetermined button may be operated instead of operating the operation icon.

Figure 16:
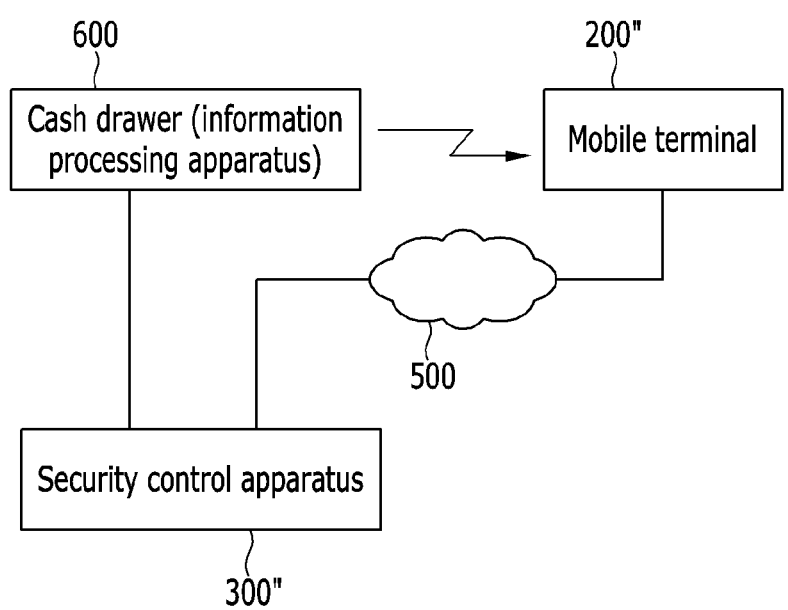
FIG. 16 is a schematic diagram showing a substituted example of the security system of the information processing apparatus according to the third embodiment.

Moreover, it has been described in the above third embodiment that the printer 100 is exemplified as an example of the information processing apparatus. However, the present invention is not limited thereto. In a substituted embodiment, as shown in FIG. 16, the cash drawer 600 may be used instead of the printer 100.

In addition, an example for determining whether the electric field strength of the signal communicated between the wireless communication units of the mobile terminal 200" and the security control apparatus 300" is greater than the predetermined value has been described in the above third embodiment. However, the present invention is not limited thereto. In one embodiment, the printer 100 may be provided with the wireless communication unit. Further, it may be determined whether the electric field strength of the signal communicated between the wireless communication units of the printer 100 and the mobile terminal 200" is greater than the predetermined value.

In the above-described first to third embodiments, an example that one printer 100 or 100' and one mobile terminal 200, 200', or 200" are connected via the security control unit 300, 300', or 300" has been described, but the present invention is not limited thereto. In one embodiment, a plurality of printers 100 or 100' may be connected to one mobile terminal 200, 200', or 200" via the security control unit 300, 300', or 300".

Figure 17:
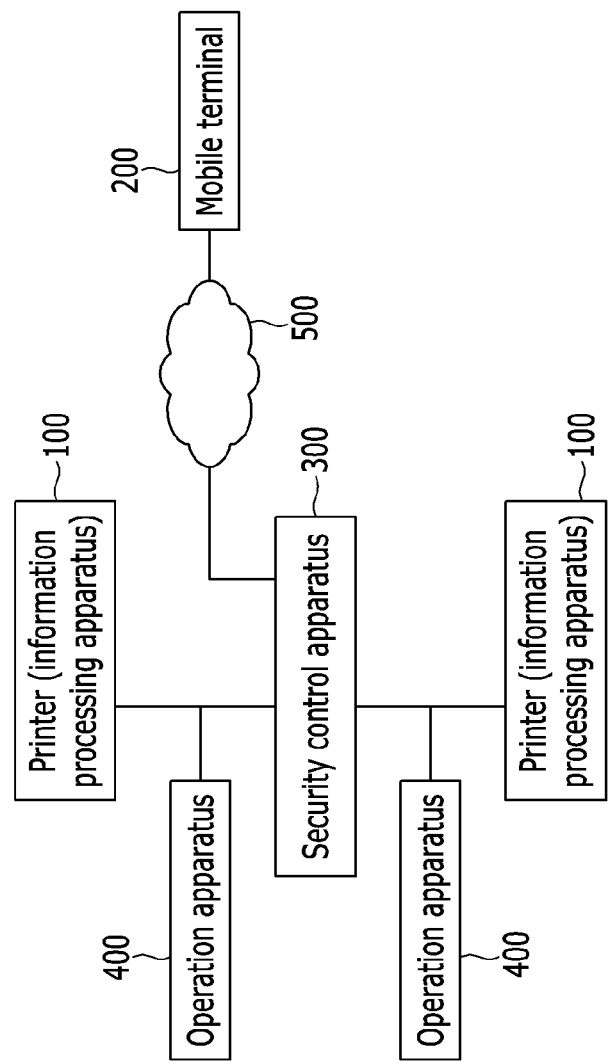
FIG. 17 is a schematic diagram showing another substituted example of the security system of the information processing apparatus according to the first embodiment.

In a substituted embodiment, when a plurality of printers 100 are provided in the first embodiment, the security system may be provided as shown in FIG. 17. In an example shown in FIG. 17, the interface 304 of the security control apparatus 300 have a plurality of ports, and the plurality of printers 100 are connected to the plurality of ports, respectively. The security control apparatus 300 stores unique printer identification information of each printer 100 in the storage unit 302. In one embodiment, when each printer 100 is connected to the security control apparatus 300, the security control apparatus 300 may automatically acquire the printer identification information from the corresponding printer 100 and store the acquired printer identification information in the storage unit 302. In another embodiment, the user may manually store the printer identification information in the security control apparatus 300.

In addition, the interface 304 of the security control apparatus 300 is connected to operation apparatuses 400 whose number being equal to the number of printers 100 connected to the interface 304. Each of the operation apparatuses 400 has unique identification information (hereinafter referred to as "button identification information"). The storage unit 302 of the security control apparatus 300 stores the button identification information of the operation apparatuses 400 in association with the printer identification information of the printers 100. In one embodiment, when each of the operation apparatuses 400 is connected to the security control apparatus 300, the security control apparatus 300 may automatically acquire the button identification information from the corresponding operation apparatus 400 and store the acquired button identification information in the storage unit 302. In another embodiment, the user may manually store the button identification information in the security control apparatus 300.

When the user wants to open a cover of a certain printer 100, the user operates the mobile terminal 200 to instruct unlocking the certain printer 100. Then, the mobile terminal 200 sends an unlock instruction signal, the terminal identification information, and the printer identification information to the security control apparatus 300.

The authentication processing unit 31 of the security control apparatus 300 compares the terminal identification information and the printer identification information transmitted from the mobile terminal 200 with the terminal identification information and the printer identification information previously stored in the storage unit 302, thereby performing the authentication. In one embodiment, the authentication may be performed by using only the terminal identification information. However, if the authentication is performed by using the terminal identification information and the printer identification information, it is possible to manage what printer 100 can be used by what mobile terminal 200.

When the authentication is successful, the security control apparatus 300 enters the monitoring mode to monitor whether the operation of the operation apparatus 400 is performed. Upon receiving the pressing signal from the operation apparatus 400 while the monitoring mode is set, the security control apparatus 300 sends the unlock instruction signal to the printer 100 in response to the unlock instruction signal received from the mobile terminal 200. As a result, the cover of the printer 100 is opened.

In a substituted embodiment, the above operation may be similarly applicable to a system using the cash drawer 600 instead of the printer 100. In another substituted embodiment, when a plurality of printer 100' or a plurality of cash drawers 600' are provided in the second embodiment, the mobile terminal 200' may transmit to the security control unit 300' printer identification information read from the NFC tag 110 of a certain printer 100' (or identification information read from the NFC tag 110 of a certain cash drawer 600') and the terminal identification information stored in the storage unit 202 together with the unlock instruction signal.

In yet another substituted embodiment, when a plurality of printers 100 or a plurality of cash drawers 600 are provided in the third embodiment, for example, a list of the printers 100 or cash drawers 600 together with the operation icon may be displayed on the mobile terminal 200". In another embodiment, a plurality of icons corresponding to the identification information of the printers 100 or cash drawers 600 may be displayed on the mobile terminal 200". Then, the mobile terminal 200" transmits to the security control apparatus 300" the identification information of the printer 100 or the cash drawer 600 that is selected through an operation of an operating unit 204 by the user and the terminal identification information stored in the storage unit 202 together with the unlock instruction signal.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A security system including an information processing apparatus provided with a locking mechanism, a security control apparatus arranged in a vicinity of the information processing apparatus, and a mobile terminal, and being configured to output an unlock instruction by using the mobile terminal, the security system comprising:
    an authentication processing unit which performs an authentication on whether the mobile terminal is permitted to output the unlock instruction;
    a distance determining unit which determines whether the mobile terminal comes within a predetermined distance from the information processing apparatus; and
    an unlocking unit which outputs an unlock instruction signal to the information processing apparatus,
    wherein the authentication processing unit and the unlocking unit are provided in the security control apparatus, and the distance determining unit is provided in the mobile terminal,
    wherein at least one of the security control apparatus and the information processing apparatus includes a wireless communication unit which performs a short-range wireless communication with a wireless communication unit of the mobile terminal,
    wherein the distance determining unit determines whether an electric field strength of a signal communicated between the wireless communication unit of either of the security control apparatus and the information processing apparatus and the wireless communication unit of the mobile terminal is greater than a predetermined value to determine that the mobile terminal comes within the predetermined distance from the information processing apparatus when the electric field strength is greater than the predetermined value,
    wherein the mobile terminal includes a notification unit which notifies that the mobile terminal comes within the predetermined distance from the information processing apparatus when the distance determining unit determines that the mobile terminal comes within the predetermined distance from the information processing apparatus, an operation unit that receives a predetermined operation in accordance with a notification by the notification unit, and an identification information transmission unit which transmits identification information,
    wherein the authentication processing unit compares the identification information transmitted from the mobile terminal with identification information that is previously stored in the security control apparatus, to perform the authentication, and
    wherein the unlocking unit outputs the unlock instruction signal to the information processing apparatus only when the predetermined operation is received by the mobile terminal and also the authentication processing unit succeeds in the authentication.

2. The security system according to claim 1, wherein the notification unit is an icon display unit, and the predetermined operation is an operation of an icon displayed in the icon display unit.

3. A security control apparatus adapted to be applied to a system for outputting an instruction of unlocking a locking mechanism provided in an information processing apparatus by using a mobile terminal and that is arranged in a vicinity of the information processing apparatus, the security control apparatus comprising:
    a wireless communication unit which communicates with the mobile terminal via a short-range wireless communication; and
    a processor including an authentication processing unit which performs an authentication on whether the mobile terminal is permitted to output the unlock instruction, and an unlocking unit which transmits an unlock instruction signal to the information processing apparatus, wherein the wireless communication unit receives a first identification information from the mobile terminal, wherein the authentication processing unit performs the authentication by comparing the first identification information transmitted from the mobile terminal with a second identification information that is previously stored in the security control apparatus, and wherein the unlocking unit outputs the unlock instruction signal to the information processing apparatus provided that a predetermined operation is received by the mobile terminal in accordance with a notification when an electric field strength of a signal communicated between either of the security control apparatus and the information processing apparatus and the mobile terminal is greater than a predetermined value, and also that the authentication processing unit succeeds in the authentication.

4. A method of outputting, by a security system including a security control apparatus arranged in a vicinity of an information processing apparatus, and a mobile terminal, an unlock instruction to the information processing apparatus by using the mobile terminal, the method comprising:

performing, by the mobile terminal, a short-range wireless communication with at least one of the security control apparatus and the information processing apparatus;

determining, by the mobile terminal, whether an electric field strength of a signal communicated between the mobile terminal and either of the security control apparatus and the information processing apparatus is greater than a predetermined value;

determining, by the mobile terminal, that the mobile terminal comes within a predetermined distance from the information processing apparatus when the electric field strength is greater than the predetermined value;

notifying, by the mobile terminal, that the mobile terminal comes within the predetermined distance from the information processing apparatus when determining that the mobile terminal comes within the predetermined distance from the information processing apparatus;

receiving, by the mobile terminal, a predetermined operation in accordance with the notification;

transmitting, by the mobile terminal, identification information;

performing, by the security control apparatus, an authentication on whether the mobile terminal is permitted to output the unlock instruction, by comparing the identification information transmitted from the mobile terminal with identification information that is previously stored in the security control apparatus; and outputting, by the security control apparatus, an unlock instruction signal to the information processing apparatus only when the predetermined operation is received by the mobile terminal and also the authentication is successfully done.

5. The method according to claim 4, wherein the notification is a display of an icon, and the predetermined operation is an operation of the displayed icon.

* * * * *